United States Patent [19]

Minnich

[11] Patent Number: 5,372,347
[45] Date of Patent: Dec. 13, 1994

[54] TILT SEAT ADAPTOR FOR VEHICLE ON INCLINE

[76] Inventor: Allen B. Minnich, 7915 N. River Rd., Zanesville, Ohio 43701

[21] Appl. No.: 860,158

[22] Filed: Mar. 30, 1992

[51] Int. Cl.⁵ .................................................. A47C 1/00
[52] U.S. Cl. .................................. 248/371; 248/185; 297/314; 297/328
[58] Field of Search ............... 248/371, 185; 297/313, 297/314, 327, 328; 296/65.1

[56] References Cited

U.S. PATENT DOCUMENTS

| | | | |
|---|---|---|---|
| 1,640,812 | 8/1927 | Ammon | 297/314 |
| 2,127,398 | 8/1938 | Freeman | 297/328 |
| 3,115,327 | 12/1963 | Murphy | 297/314 |
| 3,466,089 | 9/1969 | Stueckle | 297/314 |
| 3,970,274 | 7/1976 | Resk | 248/371 |
| 4,095,770 | 6/1978 | Long | 248/371 |
| 4,183,492 | 1/1980 | Meiller | 248/395 |
| 4,500,062 | 2/1985 | Sandvik | 297/314 |
| 4,515,337 | 5/1985 | Torras | 248/371 |
| 4,636,001 | 1/1987 | Weyenberg | 297/314 |

Primary Examiner—Eugenia Jones
Assistant Examiner—Allan M. Schrock
Attorney, Agent, or Firm—Watkins, Dunbar & Pollick

[57] ABSTRACT

A seat leveling apparatus for levelling the seat on a vehicle when the vehicle turns onto an inclined surface which includes upper and lower members that pivot relative to each other on a longitudinal axis parallel to the path of the vehicle. Apparatus is provided with a facility to latch the seat in a preselected tilted position as well as a facility to adjust the frictional restraint on the operation of the mechanism as a means of control.

6 Claims, 1 Drawing Sheet

TILT SEAT ADAPTOR FOR VEHICLE ON INCLINE

FIELD OF THE INVENTION

This invention relates generally to seats for vehicles. More specifically it relates to a seat which is adjustable for a vehicle which travels laterally on an inclined surface.

BACKGROUND OF THE INVENTION

It is common knowledge that vehicles which travel laterally on a straight incline surface will be tilted to the horizontal which requires an adjustment in the seating attitude in the occupants of the vehicle. Seated occupants will normally bend their back and tilt their upper body to the vertical position as a way of compensation. It has long been conceived that if the seating is capable of tilting in compensation to the tilting of the vehicle, riding and operating will be much improved. When the seating of the vehicle does not tilt but remains aligned with the vertical axis of the vehicle, passengers and especially the operator are inconvenienced and in some cases endangered by the inclination and fall out of the seat; and the attention of the operator is drawn away from the operation of the vehicle which may become critical under these circumstances.

The most prevalent example of this kind of situation is found in the operation of vehicle tractors which are often operated on rolling terrain where the attitude of the tractor is often changing and frequently changed to the lateral operation on an inclined surface. Frequently, the operation of a tractor includes turning around at opposite ends of the field or area being agriculturally worked. Naturally, when the vehicle reverses the inclination and attitude of the tractor, and seat for the operator, changes and rotates across the vertical axis of the tractor so that when the traverse begins in the opposite direction the seat must be tilted in the opposite direction, if it is to provide the advantages that are sought.

Lawn mowing tractors have become more universally used in suburban areas. With this increased use has come interests of prior art practitioners in attempts to provide the most convenient, safe, and comfortable tiltable tractor seat.

U.S. Pat. No. 4,636,001—Weyenberg discloses a tiltable seat for a vehicle, such as a tractor. The seat is pivoted to a support about a pivot axis that extends in a fore and aft direction with respect to the vehicle and is located midway between the sides of the seat. Tilt is adjusted by allowing fluid flow in a cylinder.

U.S. Pat. No. 4,515,337—Torras shows a self-leveling vehicle seat mount including a horizontal seat platform for mounting a seat. The seat platform tilts in grooved rollers.

U.S. Pat. No. 4,183,492—Meiller shows a seat member of a vehicle seat that is mechanically lockable in a selected one of at least three defined positions. One position is level and the others are at opposite angles.

U.S. Pat. No. 4,095,770—Long embodies a seat cushion and base which are made of metal and have oppositely disposed triangular plates attached thereto and connected by pivot pins which are axially aligned on the center of the cushion and base forming a hinge arrangement. Hydraulic pistons hold the seat at a fixed tilt positions.

U.S. Pat. No. 3,466,089—Stueckle is a seat having mounting means supporting the seat for lateral tilting movements about an axis generally longitudinal of the implement and spaced upwardly above the seat level so as to minimize the relative movement of an operator's hands and feet with respect to the implement controls during tilting movements.

U.S. Pat. No. 3,115,327—Murphy relates to improvements in adjustable seats for mowers, tractors and like agricultural vehicles and implements, and has for its principal object the provision of a rugged construction enabling adjustable lateral tilting of the seat by the operator to maintain the seat level at such times as the supporting vehicle may be operating on a lateral slope.

U.S. Pat. No. 1,640,812—Ammon relates to seat adjusters for tractors and similar machines.

While these prior devices meet some of the objectives for a tiltable tractor seat they have not completely met the objectives or the requirements for such a seat.

The present invention is distinguished from the prior art by its simplicity in accomplishing sought after features of the tiltable tractor seat. This simplicity provides for lower manufacturing costs and availability to the consumer. The special feature is the construction that allows for the tiltable seat unit to be interposed between the regular tractor seat and the frame of the tractor. This makes it possible to provide the tiltable seat mechanism as an optional accessory when components are of conventional configuration. Conventional components are also easily replaceable if lost.

The operation is simple requiring only one hand and one motion on the part of the operator to pivot and change the attitude of the seat.

SUMMARY OF THE DISCLOSURE

In summary, the invention disclosed meets the above recited needs and features and has other features including seat levelling apparatus for a vehicle, with an axis longitudinal to the travel path of the vehicle, and having a seat for an operator, comprising: (a) a frame member that is attachable to the vehicle by conventional means such as bolts and includes a longitudinal base member having upstanding end portions; (b) a seat support member which includes a longitudinal bridge member having down standing end portions in close proximity i.e. juxtaposed to the upstanding end portions of the frame member; (c) also included is pivot means connecting the ends portions providing for the frame member and the seat member to pivot with respect to each other on a axis that is parallel to the longitudinal axis with respect to the path of the vehicle;

The invention includes (d) a latch means for securing the seat support member to the frame member in selected angular pivoted positions relative to the longitudinal bridge member; and (e) adjustable clamping means is provided between the upstanding ends of the frame member and the seat support member, to selectively adjust frictional pressure between the members during rotation between the selected angular positions.

A preferred embodiment includes a lateral handle means connected to the latch means so that means of the handle the latch means can be operated in and out or back and forth to rapidly disengage the latch means when the vehicle is turned and driven to travel on a different slope.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which are delineated in the included claims.

DETAILED DESCRIPTION OF PREFERRED EMBODIMENT OF A BESET MODE OF PRACTICING THE INVENTION

Figure 1:
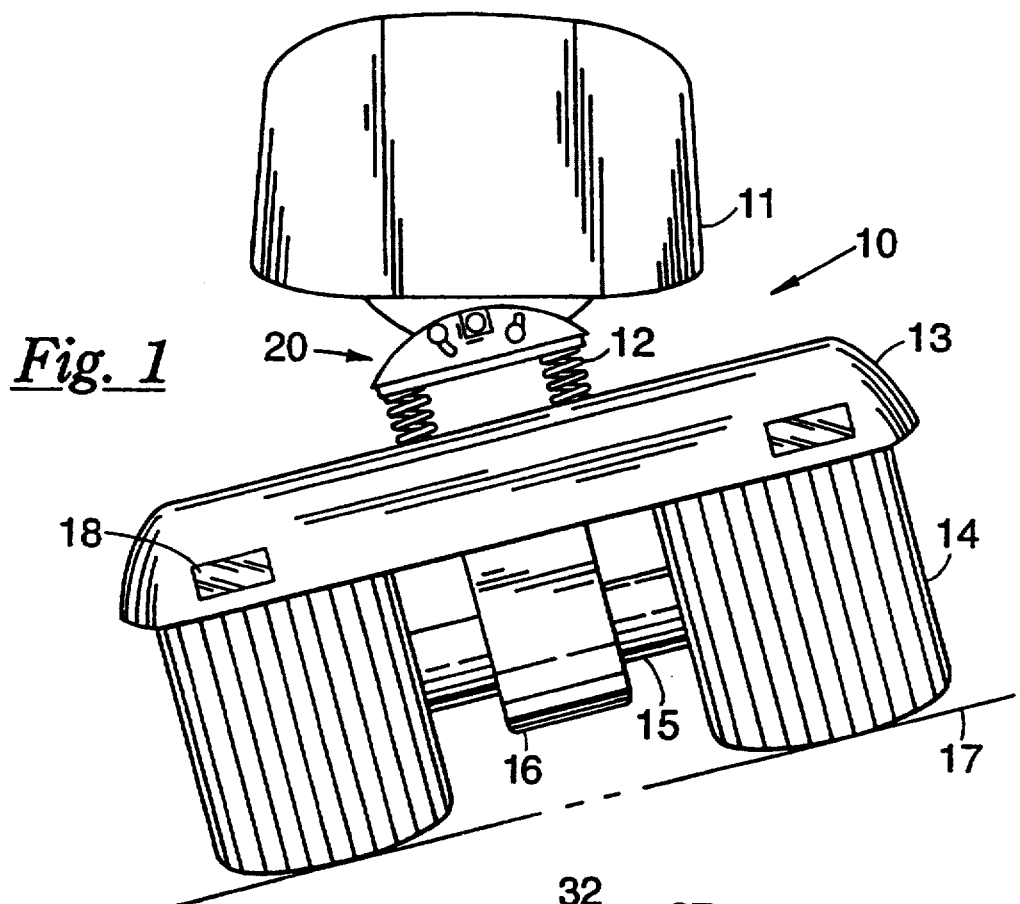
FIG. 1 is a rear view of a tractor vehicle having a seat leveling apparatus of this invention in place between the tractor frame and the seat.

Referring to FIG. 1 the rear of a vehicle 10 is shown as having a seat 11 fastened to an attachment means 12, such as springs, a horizontal cover 13, and tires 14. Drive axles 15 are shown connecting the wheels 14 to a transmission 16. The Tractor 10 is depicted as in an angled position on an inclined terrain 17. The tractor may have reflector lights, 18.

A seat levelling apparatus 20 of this invention is attached in position between seat 11 and the frame. As shown in FIG. 1, the seat 11 is substantially level and horizontal relative to the plane of the terrain 17 on which the tractor is supported.

Figure 2:
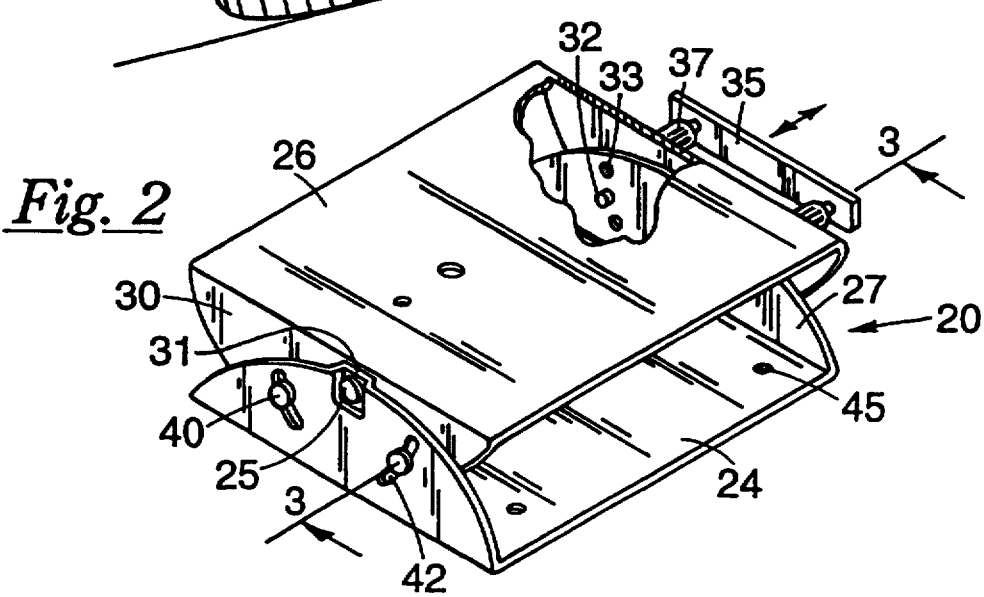
FIG. 2 is a partially sectioned perspective view of the apparatus of this invention in assembled and level position.
Figure 3:
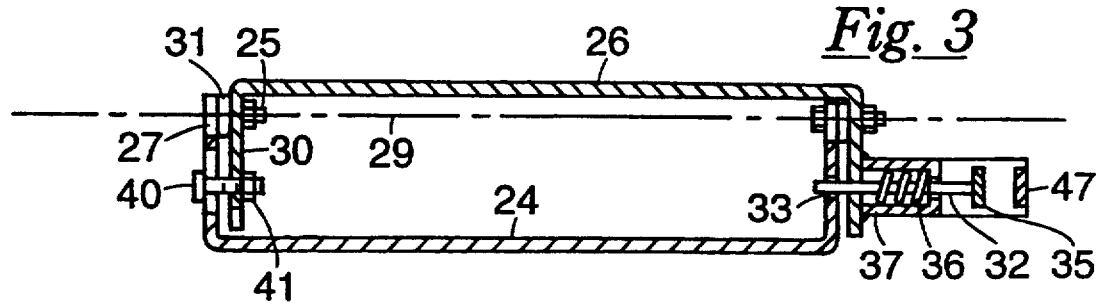
FIG. 3 is a sectional elevational view on the line 3—3 of FIG. 2.

Referring to FIGS. 2 and 3 the seat leveling apparatus 20 comprises a frame member 24 connected by pivot means 25 to a seat support member 26. The frame member 24 is provided with upstanding end portions 27 at opposite ends. In the preferred embodiment shown, the upstanding ends are at substantially right angles to the frame member 24.

The seat support member 26 bridges between the upstanding ends of 27 and is provided with apertures 28 by means of which the seat 11 may be fastened as by means of bolts, not shown. The seat support member 26 is provided with down standing ends 30. The ends 30 are shown as being formed substantially at right angles to the surfaces of the seat support member 26. The frame member 24 and the seat support member 26 are assembled by pivot means 25, such as a bolt at each end. In the embodiment shown the ends 27 are provided with a depressed portion 31 that maintains the ends 27 and 30 in juxtaposed position relative to each other.

In FIGS. 2 and 3 the seat support member 26 and the frame member 24 are shown as parallel to each other and the seat levelling apparatus 20 is in the untilted or level position where it would normally be when the tractor is travelling on level surface.

From the level position shown, the seat support member 26 may be tilted relative to the frame member 24 by rotation on an axis 29 of the pivot means 25. When it is rotated, it is convenient and more secure in most circumstances, if it tilts to a preselected position and locks at that angle. This provides a stable and controlled operating condition for the operator of the vehicle.

Selected lock positions are secured by pins 32 at the front end of the seat leveling apparatus 20. The pins 32 are resiliently urged into in detents or apertures 33 in the upstanding end 27 at the front of the frame member 24. The detents/apertures 33 are arcuately placed relative to the pivot axis of the pivot means 25. The pins 32 may be provided at the outer end with a handle 35.

In operation, beginning on level ground the seat support member 26 and the frame member 24 are parallel to each other and the pins 32 are in the center apertures 33. When the tractor is turned onto an incline, the operator reaches down and pulls the pins out of the apertures 33, against the urging of a spring 36, a sufficient distance to disengage the pins 32 and allow the seat and seat support member 26 to rotate to a level position at which point the handle is released and the springs 36 urge the pins into the detent/aperture 33 at or nearest a level position for the seat. The latch means shown in FIGS. 2 and 3, is relatively simple to construct and to operate requiring only a motion of one hand. Of course, the handle 35 can be released as soon as the pins are disengaged and the tilting operation begins, so that the pins will snap into the next detent/aperture under the urging of the spring 36. Thus, the operation becomes conveniently habit forming and simple to carry out. As shown in FIG. 2, the operation of the handle is shown according to the arrow indicating its motion out and in as described above.

Referring to FIG. 3, in another embodiment, a gripping bar 47 is supported in a position exterior to the handle 35. With the gripping bar 47, the operator is able to pull on the pins 32 by gripping the bar 47 and the handle 35 together. It has been found that this simplifies the pin pulling operation.

In FIGS. 2 and 3, the pins 32 are shown in cylindrical housings 37, which house the spring 36.

In order to provide a measured and controlled tilting operation the seat levelling apparatus is provided with adjustable clamping means 40 at the rear end. The adjustable clamping means 40 shown includes the bolt and nut 41 which may be loosened or tightened as necessary to provide more or less friction in a sliding action that is provided for a plurality of grooves 42 in the upstanding end 27 at the rear of the apparatus 20. The grooves 42 are arcuate with the pivot means 25 being the center of their arcuate configuration. The degree of tension provided on the bolts adjust the frictional clamping action between the juxtaposed ends 27 and 30 at the rear of the apparatus 20.

It will be seen that the apparatus 20 is simple in construction by providing all of the features needed to effectively carry out the tilting and clamping activity when the vehicle switches from one incline to another.

As another potentially cost saving feature the frame member 24 and the seat support member 26 may be constructed of the same size and configuration in a metal forming or classic molding operation, thus requiring only one set of tools and dyes to make the two parts. The only difference between the two component members 24 and 26 is the position of apertures, grooves, and detents which can be added to the components before assembly.

Referring to FIG. 2, apertures 45, are shown substantively near the corners of the frame member 24. In a preferred embodiment, these apertures 45 are spaced equidistant from each other in a square pattern arrangement. With this arrangement the seat leveling apparatus, i.e. "tilt seat adapter", 20, may be installed in a position of 90 degrees to the longitudinal axis of the vehicle, with the "seat" facing forward. By this means the operator can tilt the seat forward while ascending a hill and backward while descending a hill. This is useful when the surface is to be traversed up and down the slope or incline.

It is herein understood that although the present invention has been specifically disclosed with the preferred embodiments and examples, modifications and variations of the concepts herein disclosed may be resorted to by those skilled in the art. Such modification and variations are considered to be within the scope of the invention and the appended claims.

I claim:

1. A seat leveling apparatus for a vehicle with an axis longitudinal to the travel path of the vehicle and having a seat for an operator, comprising:
   (a) a frame member for attachment to the vehicle including a longitudinal base member having upstanding end portions,
   (b) a seat support member including a longitudinal bridge member having downstanding end portions juxtaposed to the upstanding end portions of the frame member,
   (c) pivot means having an axis of rotation that extends through said juxtaposed downstanding and upstanding end portions, said pivot means connecting the juxtaposed downstanding and upstanding end portions so the seat support member pivots on said pivot means about said axis of rotation of means,
   (d) latch means for securing the seat support member to the frame member in selected angular pivoted positions relative to the longitudinal base member, and
   (e) adjustable clamping means for one of said juxtaposed upstanding end portions of the frame member and one of said juxtaposed downstanding end portions of the seat support member, said one upstanding end portion and said one downstanding end portion being juxtaposed one to another, said clamping means used to selectively adjust frictional pressure between the juxtaposed portions during rotation between the selected angular pivoted positions, said adjustable clamping means being affixed to one of said juxtaposed end portions and positioned in a groove of said other juxtaposed end portion with said groove allowing said adjustable clamping means to move therein during rotation between the selected angular pivoted positions of said juxtaposed upstanding and downstanding portions.

2. A seat leveling apparatus according to claim 1 wherein the groove in which the adjustable clamping means is positioned is an arcuate groove in said one of the upstanding end portions of the base member.

3. A seat leveling apparatus according to claim 1 wherein the latch means is resiliently urged by spring means through selectively positioned apertures in one of said juxtaposed end portions.

4. A seat leveling apparatus according to claim 3 wherein the latch means comprises reciprocal pins which are resiliently urged by said spring means into the apertures and are operated by an interconnected handle member.

5. An adjustable seat levelling apparatus according to claim 1 wherein the pivot means comprises a bolt means.

6. A seat leveling apparatus according to claim 1 wherein the seat support member and the frame member are identically configured and are interchangeable in manufacturing operations.

* * * * *